(12) United States Patent
Ashida et al.

(10) Patent No.: US 7,070,715 B2
(45) Date of Patent: Jul. 4, 2006

(54) DISAZO COMPOUND OR SALT THEREOF AND POLARIZING FILM USING THE SAME

(75) Inventors: Toru Ashida, Toyonaka (JP); Yoshiteru Ohta, Ikoma-gun (JP); Narutoshi Hayashi, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 236 days.

(21) Appl. No.: 10/642,193

(22) Filed: Aug. 18, 2003

(65) Prior Publication Data

US 2004/0069976 A1    Apr. 15, 2004

(30) Foreign Application Priority Data

Aug. 19, 2002 (JP) ............................. 2002-237940
May 23, 2003 (JP) ............................. 2003-145862

(51) Int. Cl.
*G02B 5/30* (2006.01)
*F21V 9/14* (2006.01)
*C09B 31/02* (2006.01)
*C09B 35/02* (2006.01)

(52) U.S. Cl. ...................... 252/585; 359/483; 359/490; 359/491; 534/827

(58) Field of Classification Search .................. 252/585
See application file for complete search history.

(56) References Cited

U.S. PATENT DOCUMENTS 5,318,856 A    6/1994  Misawa et al.
6,552,849 B1 *  4/2003  Furuhashi et al. .......... 359/491

FOREIGN PATENT DOCUMENTS

| JP | 1-172907 A | 7/1989 |
| JP | 1-252904 A | 10/1989 |
| JP | 9-302249 A | 11/1997 |
| JP | 2001-235629 A | 8/2001 |
| JP | 2002-357720 | * 12/2002 |
| WO | WO 00/37973 | * 6/2000 |

* cited by examiner

*Primary Examiner*—Randy Gulakowski
*Assistant Examiner*—Timothy J. Kugel
(74) *Attorney, Agent, or Firm*—Sughrue Mion, PLLC

(57) ABSTRACT

The present invention provides a disazo compound of the formula (I) or a salt thereof

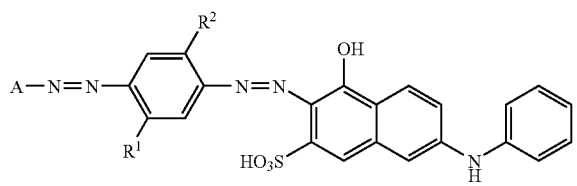

(I)

wherein A represents 4-sulfophenyl or 6,8-disulfo-2-naphtyl, one of $R^1$ and $R^2$ represents hydrogen or methyl.

The present invention also provides a dye-based polarizing film comprising a base material and the disazo compound of the formula (I) or the salt thereof contained in the base material.

The disazo compound of the present invention provides a polarizing film, which is excellent in light resistance and initial polarizing performance, particularly light resistance when used as a polarizing element.

5 Claims, No Drawings

DISAZO COMPOUND OR SALT THEREOF AND POLARIZING FILM USING THE SAME

BACKGROUND OF THE INVENTION

1. Field of the Invention

The present invention relates to a disazo compound or a salt thereof and a polarizing film using the disazo compound or the salt thereof, and specifically to a disazo compound or a salt thereof, which covers a wavelength with a range of 520 to 580 nm in the case of being used as a polarizing element, and a polarizing film using the disazo compound or the salt thereof.

2. Prior Art

A dye-based polarizing film is manufactured in such a manner that a base material for polarizing film, such as a oriented polyvinyl alcohol-based film or polyene-based film which is obtained by orienting polyene produced through dehydrochlorination of polyvinyl chloride film or dehydration of polyvinyl alcohol-based film, to which is added a dye that covers a desirable wavelength as a polarizing element. For example, a compound having the following structure is described in WO 00/37973 as dye, which covers a wavelength with a range of 520 to 580 nm in the case of being used as a polarizing element.

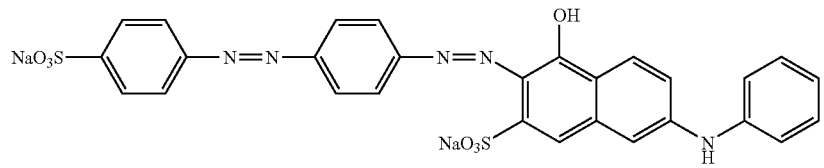

The polarizing film, which is obtained by using the above-mentioned disazo compound, however, has not necessarily been satisfactory from the viewpoint of light resistance and initial polarizing performance, particularly light resistance.

SUMMARY OF THE INVENTION

An object of the present invention is to provide disazo dye for a polarizing film, which is excellent in light resistance and initial polarizing performance, particularly light resistance when used as a polarizing element.

The present invention provides the followings:

<1> A disazo compound of the formula (I) or a salt thereof.

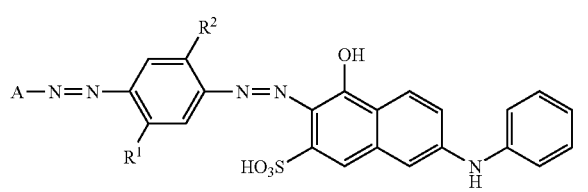

wherein A represents 4-sulfophenyl or 6,8-disulfo-2-naphtyl, one of $R^1$ and $R^2$ represents hydrogen and the other represents methyl <2> The disazo compound or the salt thereof according to <1>, wherein A represents 4-sulfophenyl, $R^1$ represents methyl and $R^2$ represents hydrogen.

<3> The disazo compound or the salt thereof according to <1>, wherein A represents 4-sulfophenyl, $R^1$ represents hydrogen and $R^2$ represents methyl.

<4> The disazo compound or the salt thereof according to <1>, wherein A represents 6,8-disulfo-2-naphtyl, $R^1$ represents methyl and $R^2$ represents hydrogen.

<5> A dye-based polarizing film comprising a base material and a disazo compound of the formula (I) or a salt thereof contained in the base material.

<6> The dye-based polarizing film according to <5> wherein the base material is a film comprising polyvinyl alcohol-based resin.

DESCRIPTION OF PREFERRED EMBODIMENTS

A in the formula (I) is 4-sulfophenyl or 6,8-disulfo-2-naphtyl.

Between $R^1$ and $R^2$, one of them is hydrogen and the other is methyl. That is, when $R^1$ is hydrogen, $R^2$ is methyl, and when $R^1$ is methyl, $R^2$ is hydrogen.

Disazo compound (I) or salt thereof can be manufactured, for example, by a method described below.

First, an amino compound of the formula (II)

wherein A has the same meaning as defined above, usually reacts with sodium nitrite in acidic aqueous solvent at a temperature in a range of from 0 to 40° C. so as to subject the compound (II) to diazotization. Next, the diazo compound obtained usually reacts with aniline compound of the formula (III)

wherein $R^1$ and $R^2$ have the same meanings as defined above, in an aqueous solvent at a temperature of from 0 to 40° C. and pH of from 6 to 11 so as to obtain monoazo compound of the formula (IV).

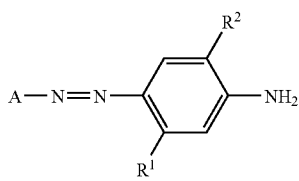

The above-mentioned monoazo compound (IV) usually reacts with sodium nitrite in an acidic aqueous solvent at a temperature of from 0 to 40° C. so as to subject the monoazo compound (IV) to diazotization.

Finally, the disazo compound (I) or the salt thereof can be obtained by reacting the diazo compound obtained above with naphthol compound of the formula (V)

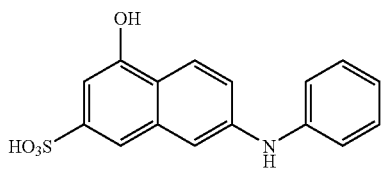

in aqueous solvent at a temperature of from 0 to 40° C. and pH of from 6 to 11. The product to be obtained, whether the disazo compound (I) or the salt thereof, depends on the pH of the final reaction product.

Examples of the salt of the disazo compound (I) include alkali metal salt such as lithium salt, sodium salt and potassium salt; ammonium salt; organic amine salt such as ethanolamine salt and alkylamine salt; and the like. When the disazo compound (I) is used for polarizing film, sodium salt of the disazo compound (I) is preferred.

Examples of the salt of the disazo compound (I) include the followings:

When the disazo compound (I) or the salt thereof is used for polarizing film contained in base materials, other organic dyes can be used together, to correct the hue and improve the polarization performance. Any dye with a high dichroism may be used as the organic dyes in this case, and the selection of dye particularly with a superior light resistance makes polarizing films suitable for liquid crystal projectors.

Specific examples of such organic dyes include the following which are represented in Color Index Generic Name:
C.I. Direct Yellow 12
C.I. Direct Yellow 28
C.I. Direct Yellow 44
C.I. Direct Orange 26
C.I. Direct Orange 39
C.I. Direct Orange 107
C.I. Direct Red 2
C.I. Direct Red 31
C.I. Direct Red 79
C.I. Direct Red 81
C.I. Direct Red 117
C.I. Direct Red 247

A dye-based polarizing film of the present invention can be manufactured in such a manner that polymer film which is a base material for a polarizing film contains dichroic dye comprising disazo compound (I) or salt thereof and additionally other organic dyes by a conventional method. Examples of the polymer film to be used include polyvinyl alcohol-based resin, polyvinyl acetate resin, ethylene-vinyl acetate (EVA) resin, nylon resin, polyester resin, and the like. The polyvinyl alcohol-based resin herein includes polyvinyl alcohol itself which is partly or completely saponified matter of polyvinyl acetate; saponified EVA resin, namely, saponified matter of copolymer of vinyl acetate with other copolymerizable monomers, for example, olefins such as ethylene and propylene, unsaturated carboxylic acids such as crotonic acid, acrylic acid, methacrylic acid and maleic acid, unsaturated sulfonic acids, vinyl ethers and the like; polyvinyl formal and polyvinyl acetal which are obtained by modifying polyvinyl alcohol by aldehyde, and the like. Among them, the polyvinyl alcohol-based film,

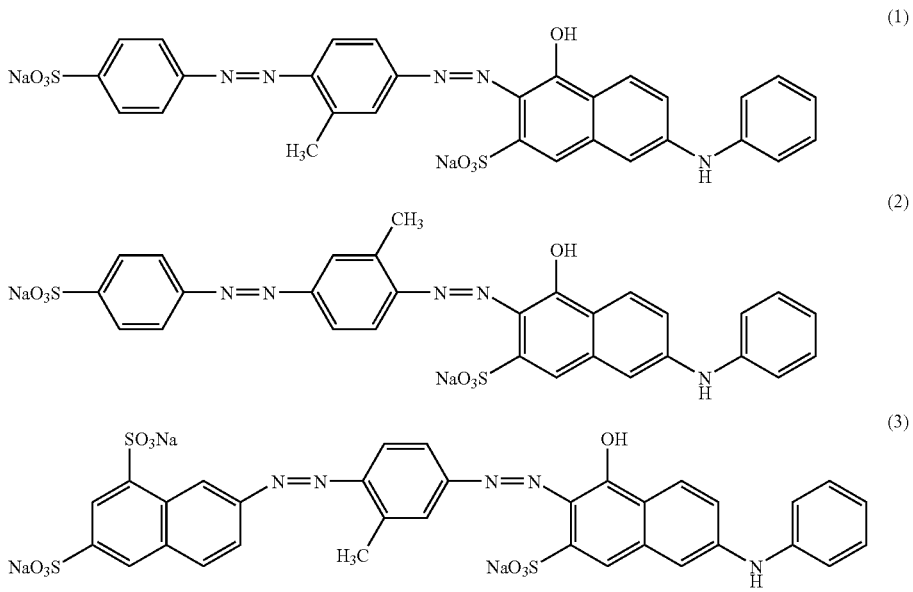

particularly polyvinyl alcohol film is suitably used as a base material for a polarizing film in point of absorption and orientation of dye.

In the case that the polymer film contains the above-mentioned dye, a method of dyeing the polymer film is typically employed. The dyeing can be performed, for example, in the following manner. First, the above-mentioned dye is dissolved in water to prepare a dyebath. Though it is not particularly limited, the concentration of the dye in the dyebath is typically selected from a range of 0.0001 to 10% by weight. Also, as required, a dyeing assistant may be used; for example, sodium sulfate decahydrate (Glauber's salt) is suitably used by 0.1 to 10% by weight in the dyebath. The polymer film is immersed in the dyebath thus prepared to be dyed. The temperature for the dyeing is preferably 40 to 80° C. The orientation of the dye is performed by stretching the polymer film. A wet method, a dry method or the like may be employed as a method of stretching. The stretching of the polymer film may be performed either before or after dyeing.

Post treatment such as boric acid treatment is performed, as required, for the oriented polymer film containing the dye by a conventional method. Such post treatment is performed for the purpose of improving ray transmittance, polarization degree and durability of the polarizing film. The boric acid treatment varies with the kind of the polymer film and the dye employed, and is usually performed in a temperature range of from 30 to 80° C., preferably from 50 to 80° C. by using an aqueous solution of boric acid having a concentration with a range of generally from 1 to 15% by weight, preferably from 5 to 10% by weight. In addition, as required, a fixing treatment may be performed together by an aqueous solution containing a cationic polymer.

The dye-based polarizing film thus obtained can be made into a polarizing plate by laminating protective film, which is superior in optical transparency and mechanical strength, on one side or both sides thereof. A material to be used for forming the protective film may be conventionally used materials, for example, a cellulose acetate-based film, an acrylic-based film, a fluoride resin-based film such as tetrafluoroethylene-hexafluoropropylene copolymer, a polyester-based film, a polyolefin-based film, a polyamide-based film, and the like.

The present invention will be described more specifically by way of examples, which are not construed to limit the scope of the present invention. 'Percentage' and 'part' in the examples mean 'Percentage by weight' and 'part by weight' respectively, unless otherwise specified.

EXAMPLE 1

110 parts of the monoazo compound of the formula (4)

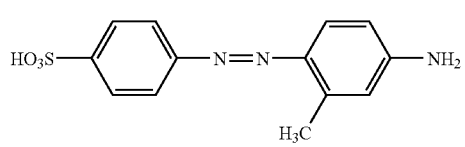

(4)

and 30 parts of sodium nitrite were added to 1500 parts of water, and thereafter 120 parts of 35% hydrochloric acid was added thereto, and the mixture was stirred at a temperature of 0 to 10° C. for 2 hours to obtain a solution of diazo compound.

Meanwhile, 157 parts of the naphthol compound of the formula (5)

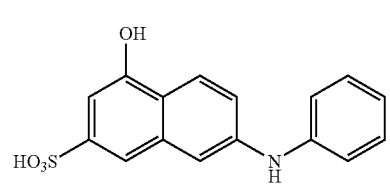

(5)

was added to 700 parts of water and the mixture was stirred at a temperature of 0 to 10° C. The solution of the diazo compound obtained above was added to this mixture over a period of 1 hour while maintaining pH of 7 in the reaction solution by adding an aqueous solution of sodium carbonate. After the addition of the diazo compound solution, a coupling reaction was performed by stirring for another 1 hour to obtain the disazo compound of the formula (1). The value of λmax of this disazo compound was denoted at 539 nm in aqueous solvent.

A polyvinyl alcohol film having a thickness of 75 μm (the trade name "KURARAY VINYLON #7500" manufactured by Kuraray Co., Ltd.) was stretched longitudinally uniaxially by five times to be made into a base material for a polarizing film. This polyvinyl alcohol film was immersed in aqueous solution at a temperature of 70° C., which was adjusted to pH of 9 in concentrations of 0.025% for the salt of the disazo compound (1) and 0.2% for sodium sulfate decahydrate (a dyeing assistant), while being maintained in a condition tension. Next, after being immersed in a 7.5% aqueous solution of boric acid at a temperature of 78° C. for 5 minutes, the polyvinyl alcohol film was taken out and washed with water at a temperature of 20° C. for 20 seconds and dried at a temperature of 50° C. so as to obtain a polarizing film. The value of λmax (a wavelength for minimizing the transmittance of the film in a stretching direction, hereinafter the same) of the polarizing film obtained was denoted at 550 nm, and this polarizing film exhibited a high polarization degree. The polarizing film also exhibited a long-time durability in a condition of high temperature and high humidity. When the polarizing film here obtained was irradiated by a high-pressure mercury lamp for 48 hours so as to observe absorbance change (ΔA) thereof, the value was 0.3, leading to a superior light resistance.

A polyvinyl alcohol film having a thickness of 75 μm (the trade name "Kuraray Vinylon #7500" manufactured by Kuraray Co., Ltd.) was stretched longitudinally uniaxially by five times to be made into a base material for a polarizing film. This polyvinyl alcohol film was immersed in aqueous solution at a temperature of 70° C., which is adjusted to pH of 9 in concentrations of 0.025% for salt of the disazo compound (1) and 0.2% for sodium sulfate decahydrate (a dyeing assistant), while being maintained in a condition of its tension. Next, after being immersed in 7.5% of aqueous solution of boric acid at a temperature of 78° C. for 5 minutes, the polyvinyl alcohol film was taken out and washed with water at a temperature of 20° C. for 20 seconds and dried at a temperature of 50° C. so as to obtain a polarizing film. The value of λmax (a wavelength for minimizing the transmittance of the film in a stretching direction, hereinafter the same) of the polarizing film obtained denoted 550 nm, and this polarizing film exhibited a high polarization degree. The polarizing film also exhibited a long-time durability in a condition of high temperature and high humidity. When the polarizing film here obtained was irradiated by a high-pressure mercury lamp for 48 hours so as to observe absorbance change (ΔA) thereof, the value was 0.3, leading to a superior light resistance.

EXAMPLE 2

The salt of the disazo compound of formula (2) was obtained in the same manner as in Example 1 except for using the azo compound of the formula (6)

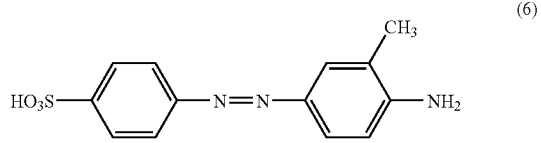

(6)

instead of the azo compound (4). The value of λmax of this salt was denoted at 532 nm in an aqueous solvent.

The polyvinyl alcohol film having a thickness of 75 μm (the trade name "KURARAY VINYLON #7500" manufactured by Kuraray Co., Ltd.) was stretched longitudinally uniaxially by five times to be made into a base material for a polarizing film. This polyvinyl alcohol film was immersed in aqueous solution at a temperature of 70° C., which was adjusted to pH of 9 in concentrations of 0.025% for the salt of the disazo compound (2) and 0.2% for sodium sulfate decahydrate (a dyeing assistant), while being maintained in a condition tension. Next, after being immersed in a 7.5% aqueous solution of boric acid at a temperature of 78° C. for 5 minutes, the polyvinyl alcohol film was taken out and washed with water at a temperature of 20° C. for 20 seconds and dried at a temperature of 50° C. so as to obtain a polarizing film. The value of λmax of the polarizing film obtained denoted at 550 nm, and this polarizing film exhibited a high polarization degree. The polarizing film also exhibited a long-time durability in a condition of high temperature and high humidity. When the polarizing film here obtained was irradiated by a high-pressure mercury lamp for 48 hours so as to observe absorbance change (ΔA) thereof, the value was 0.5, leading to a superior light resistance.

COMPARATIVE EXAMPLE 1

A polyvinyl alcohol film having a thickness of 75 μm (the trade name "KURARAY VINYLON #7500" manufactured by Kuraray Co., Ltd.) was stretched longitudinally uniaxially by five times to be made into a base material for a polarizing film. This polyvinyl alcohol film was immersed in an aqueous solution at a temperature of 70° C., which was adjusted to a pH of 9 in concentrations of 0.025% for the salt of the following disazo compound (7) and 0.2% for sodium sulfate decahydrates (a dyeing assistant), while being maintained in a condition of tension. Next, after being immersed in a 7.5% aqueous solution of boric acid at a temperature of 78° C. for 5 minutes, the polyvinyl alcohol film was taken out and washed with water at a temperature of 20° C. for 20 seconds and dried at a temperature of 50° C. so as to obtain a polarizing film. The value of λmax of the polarizing film obtained was denoted at 550 nm.

When the polarizing film here obtained was irradiated by a high-pressure mercury lamp for 48 hours so as to observe absorbance change (ΔA) thereof, the value was 0.9.

TABLE 1

(7)

| Object Compound | λmax (nm) of Polarizing Film | ΔA |
|---|---|---|
| EXAMPLE 1 | Disazo Compound (1) | 550 | 0.3 |
| EXAMPLE 2 | Disazo Compound (2) | 550 | 0.5 |
| COMPARATIVE EXAMPLE 1 | Disazo Compound (7) | 550 | 0.9 |

ΔA is the value of absorbance after being irradiated by a high-pressure mercury lamp for 48 hours, and lower value thereof denotes more favorable light resistance.

The disazo compound or salt thereof of the present invention is particularly superior in light resistance against a long-time exposure when used as a polarizing element. Also, a dye-based polarizing film of the present invention is superior in light resistance against a long-time exposure and initial polarizing performance, thereby it can be used for a liquid crystal projector and an in-car display device (a car navigation system).

What is claimed is:

1. A disazo compound of the formula (I) or a salt thereof:

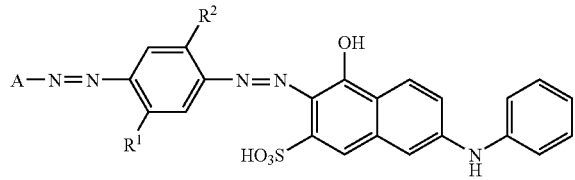
(I)

wherein A represents 6,8-disulfo-2-naphthyl, $R^1$ represents methyl and $R^2$ represents hydrogen.

2. The disazo compound or the salt thereof according to claim 1, wherein A represents 4-sulfophenyl, $R^1$ represents methyl and $R^2$ represents hydrogen.

3. The disazo compound or the salt thereof according to claim 1, wherein A represents 4-sulfophenyl, $R^1$ represents hydrogen and $R^2$ represents methyl.

4. A dye-based polarizing film comprising a base material and a disazo compound of the formula (I) or a salt thereof contained in the base material:

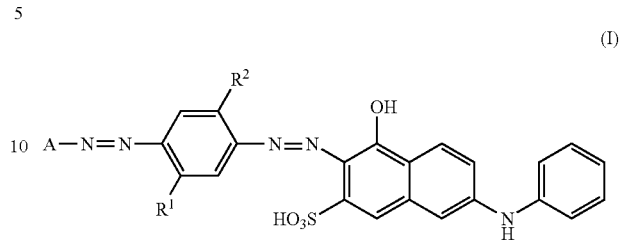
(I)

wherein A represents 6,8-disulfo-2-naphthyl, $R^1$ represents methyl and $R^2$ represents hydrogen.

5. The dye-based polarizing film according to claim 4 wherein the base material is a film comprising polyvinyl alcohol-based resin.

* * * * *